United States Patent
Naum et al.

(10) Patent No.: US 8,110,123 B2
(45) Date of Patent: Feb. 7, 2012

(54) HIGH-BRIGHTNESS YELLOW-ORANGE YELLOW PHOSPHOR FOR WARM WHITE LED

(75) Inventors: Soshchin Naum, Changhua (TW); Wei-Hung Lo, Taipei (TW); Chi-Ruei Tsai, Taipei (TW)

(73) Assignee: Wei-Hung Lo, Taipei (TW)

( * ) Notice: Subject to any disclaimer, the term of this patent is extended or adjusted under 35 U.S.C. 154(b) by 644 days.

(21) Appl. No.: 12/254,169

(22) Filed: Oct. 20, 2008

(65) Prior Publication Data

US 2009/0152495 A1 Jun. 18, 2009

(30) Foreign Application Priority Data

Dec. 12, 2007 (TW) ................................ 96147535 A

(51) Int. Cl.
*C09K 11/02* (2006.01)
(52) U.S. Cl. ................................. 252/301.4 R
(58) Field of Classification Search ........... 252/301.4 R; 313/467, 468
See application file for complete search history.

(56) References Cited

U.S. PATENT DOCUMENTS

2009/0267485 A1* 10/2009 Nagatomi et al. ............. 313/503
2010/0032622 A1* 2/2010 Naum et al. ............ 252/301.4 F

FOREIGN PATENT DOCUMENTS

WO WO 2007037059 A1 * 4/2007
* cited by examiner

*Primary Examiner* — Jerry Lorengo
*Assistant Examiner* — Lynne Edmondson
(74) *Attorney, Agent, or Firm* — The Weintraub Group, P.L.C.

(57) ABSTRACT

A high-brightness yellow-orange yellow phosphor for use in warm white LED (light emitting diode), the high-brightness yellow-orange yellow phosphor comprises a substrate based on a rare-earth garnet and cerium for activating said substrate. The high-brightness yellow-orange yellow phosphor has the substances of $Li^{+1}$, $Mg^{+2}$ and $N^{-3}$ contained therein so that the overall stoichiometric equation of the substrate is: $\Sigma(Ln)_3 Al_{5-x}Li_{(x+y)}Mg_{(x+y)}O_{12-3y}N_{3y}$, and, the high-brightness yellow-orange yellow phosphor radiates in a visible orange yellow band at $\lambda=538\sim569$ nm when activated by a shortwave light from an InGaN semiconductor heterostructure.

4 Claims, No Drawings

HIGH-BRIGHTNESS YELLOW-ORANGE YELLOW PHOSPHOR FOR WARM WHITE LED

BACKGROUND OF THE INVENTION

1. Field of the Invention

The present invention relates to semiconductor microelectronics and light emitting technology and more particularly, to a high-brightness yellow-orange yellow phosphor for use in the fabrication of warm white LEDs, which is prepared from a rare earth element YAG $(Y_3Al_5O_{12})$:$Ce^{3+}$ based substrate added with $Li^{+1}$, $Mg^{+2}$ and $N^{-3}$. Following increase of the concentration of $Li^{+1}$, $Mg^{+2}$ and $N^{-3}$ in the composite of the phosphor, the strength of the maximum value of the phosphor spectrum is enhanced by 5~13%.

2. Description of the Related Art

Because of low efficiency and strength during the first development stage, LEDs are simply used for analog and numerical signal indication. After issue of the fundamental paper from Japanese researcher S. Nakamura (refer to S. Nakamura and. Blue laser. Springer Verl. Berlin 1997), an ordered of quantum size architecture in In—Ga—N semiconductor heterojunction is established, resulting in enhancement of semiconductor architecture radiation strength over several tens of hundreds of times. Thus, light radiators-LEDs begin for home, building and landscape illumination. Thereafter, researchers of "Nichia Corporation" created white light LED in which the first blue photoluminescence excites yellow phosphor to produce yellow long wave photoluminescence. In conformity with Newton complementary color principle, the two radiations are combined into a light beam of bright white light. It is to be fairly pointed out that a long time before the aforesaid Japanese researchers, Russian engineer discovered Ga—N semiconductor heterostructure-based Stokes phosphor (the wavelength of the radiation light is greater than the wavelength of the excitation light) for use to produce any color radiation including white light. The invention used the prior art of the Japanese engineers as a standard. These prior art designs use the known rare earth elements to synthesize garnet substrate-based phosphor that uses cerium for activation, having the stoichiometric formula: $(\Sigma Ln)_3Al_5O_{12}$.

The rare earth elements used are Y, Gd, Ce and the periodical cycle system group IIIA elements used are Al and Ga. Changing the ratio of yttrium and gadolinium can control the radiation spectrum of the main activator in the phosphor material activated by $Ce^{+3}$ and simultaneously shift the luminance maximum value to $\lambda=538\sim560$ nm. Changing the ratio of $Al^{+3}$ and $Ga^{+3}$ in the anion crystal lattice of the compound causes the phosphor to change its photoluminescence-excitation spectrum. Increasing the content of gallium ion to substitute for aluminum ion can shift the maximum value of the photoluminescence-excitation spectrum to $\lambda=465\sim445$ nm.

Many patent disclosures and samples made contribution to phosphor for warm white LED. For example, one inventor of the present invention, doctor Soshchin compared the grades of various different phosphors for white LED. However, the technical problem is complicated. At first: YAG-based conventional phosphors, i.e., $(Y,Gd,Ce)_3Al_5O_{12}$-compound has no any continuous solid solution series in the all Y—Gd-concentration. Extreme value [Gd]≈0.35 atomic fraction has low thermal stability at this time and, when heated to T=100° C., the efficiency of quantum radiation dropped substantially by 50%. The other problem (please refer to Abramov. V. C. Russia N635813 Sep. 12, 1977) is that, the novel garnet material $Mg_3Ln_2(Si,Ge)_4O_{12}$:Ce has low efficiency despite of being capable of creating $\lambda>600$ nm orange yellow-red phosphor.

SUMMARY OF THE INVENTION

The present invention has been accomplished under the circumstances in view. It is therefore the main object of the present invention to provide a yellow-orange yellow phosphor for use in the fabrication of warm white LEDs, which is prepared from a rare earth element YAG $(Y_3Al_5O_{12})$:$Ce^{3+}$ based substrate having high luminance. It is another object of the present invention to provide a yellow-orange yellow phosphor for use in the fabrication of warm white LEDs, which provides enhanced material radiation having chromaticity coordinates x=0.36~0.38 and y=0.44~0.46. It is still another object of the present invention to provide a yellow-orange yellow phosphor for use in the fabrication of warm white LEDs, which has high brightness and high thermal stability at the temperature range T=100~150° C.

To achieve these and other objects of the present invention, the high-brightness yellow-orange yellow phosphor for use in warm white LED (light emitting diode) in accordance with the present invention comprises a substrate based on a rare-earth garnet and cerium for activating the substrate. Wherein the high-brightness yellow-orange yellow phosphor has the Periodic System Groups I, II and V ions of $Li^{+1}$, $Mg^{+2}$ and $N^{-3}$ contained therein; the overall stoichiometric equation of the substrate is: $\Sigma(Ln)_3Al_{5-x}Li_{(x+y)}Mg_{(x+y)}O_{12-3y}N_{3y}$; when activated by a shortwave light from an InGaN semiconductor heterostructure, the high-brightness yellow-orange yellow phosphor radiates in a visible orange yellow band at a predetermined wavelength.

DETAILED DESCRIPTION OF THE PREFERRED EMBODIMENT

The main object of the present invention is to eliminate the drawback of the aforesaid prior art phosphor and warm white LED. To achieve this object, the invention provides a high-brightness yellow-orange yellow phosphor for use in warm white LED. The phosphor uses a rare-earth garnet as the substrate and cerium as the activating agent. The invention is characterized in that the phosphor has the substances of $Li^{+1}$, $Mg^{+2}$ and $N^{-3}$ contained therein; the overall stoichiometric equation of the phosphor substrate is: $\Sigma(Ln)_3Al_{5-x}Li_{(x+y)}Mg_{(x+y)}O_{12-3y}N_{3y}$; when the phosphor is activated by a shortwave light from an InGaN semiconductor heterostructure, it radiates in a visible orange yellow band at a predetermined wavelength, in which, the atomic fraction of the phosphor is $\Sigma Ln=\Sigma(Y+Gd+Ce+Dy+Pr)=1$;

in which, the stoichiometric formula index is: $0.0001 \leq x \leq 0.15$, $0.0001 \leq y \leq 0.15$;

in which, the predetermined wavelength is: $\lambda=538\sim569$ nm;

in which, the ratio of the added cationic lattice of rare earth elements in the phosphor is: $0.30 \leq Y/\Sigma Ln \leq 0.95$, $0.05 \leq Gd/\Sigma Ln \leq 0.70$, $0.005 \leq Ce/\Sigma Ln \leq 0.1$, $0.001 \leq Dy/\Sigma Ln \leq 0.01$ and $0.001 \leq Pr/\Sigma Ln \leq 0.01$;

in which, the amount of ions added to the anionic lattice composite is $0.015 > \Sigma(Li, Mg, N) > 0.001$, and the optimal concentration under this condition is $[Li]=[Mg] \approx 0.005$ atomic fraction;

in which, the phosphor is a cubic phase powder, having a hexagonal dodecahedron configuration, mid-diameter $d_{cp} \approx 3.5\sim6\mu$, dispersion $\tau \approx 4$ units;

in which, the maximum spectrum value of the phosphor is at λ=548 nm and shifted to λ=550 nm, and at the same time the concentration of the added $Li^{+1}$, $Mg^{+2}$ and $N^{-3}$ is increased;

in which the total concentration rises subject to increase in $Li^{+1}$, $Mg^{+2}$ and $N^{-3}$ concentration in the phosphor composite, and the maximum spectrum value of the phosphor is enhanced by 5~13%;

in which, the total energy of radiation of the phosphor is increased by 100~120% following increase in $Li^{+1}$, $Mg^{+2}$ and $N^{-3}$ concentration in the phosphor composite.

The physical chemistry principle of the composite of the phosphor of the present invention is outlined hereinafter. At first, the phosphor pertains to the known rare earth element garnet, having a cubic lattice structure and being associated with Ia3d. This is just the only similarity between the known techniques and the present invention. A phosphor according to the prior art may be added with yttrium, gadolinium, cerium, aluminum and/or gallium. The cation crystal lattice of the compound provided by the present invention includes four elements: yttrium, gadolinium, cerium, dysprosium & praseodymium. At this time, the last three elements carry out the effect of active filler. In these ions, the first and the second constitute the base of the cation crystal lattice. A substantial change is also occurred in the anion crystal lattice: $Al^{+3}$ is partially substituted by $Li^{+1}$ and $Mg^{+2}$. At this time, $O^{-2}$ is partially substituted by $N^-$ in the anion crystal lattice. It can quickly be seen that the added $Dy^{+3}$ causes an equi-valent substitution system in the cation crystal lattice, and at the same time the added $Li^{+1}$, $Mg^{+2}$ and $N^{-3}$ cause an aliovalent substitution system, requiring a local charge compensation. The equations involve these systems are recorded as follows:

   (1)

   (2)

   (3)

thus, (1)+(2)

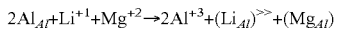

therefore, (1)+(2)+3(3)

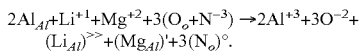

From the last response, we obtained the conclusion: one pair of ions $(Li_{Al})^{>>}+(Mg_{Al})'$ can compensate for 3 $3(N_o)^\circ$ charges. From the charge compensation system $(Li_{Al})^{>>}+(Mg_{Al})'=3(N_o)^\circ$, it is clearly and strictly observed that three negative charges are compensated by three units of over positive charge. Thus, the number of lattice points at the left side of the equation and the number of lattice points at the right side of the equation correspond to 2 and 3 respectively. By this, charge exchange and mass exchange are performed separately, realizing the synthesis of the present invention. The ion radius of the ion been substituted $Al^{+3}$ is $\tau_{Al}$=0.58~0.65 A. At this time, the ion radius of $Li^{+1}$ and $Mg^{+2}$ are $\tau_{Li}$=0.65 A and $\tau_{Mg}$=0.68 A, i.e., larger than the ion been substituted $Al^{+3}$. When these discriminations are smaller than 10%, the requisite substitution probability is relatively increased. $O^{-2}$ in the anion crystal lattice has an iron radius $\tau_o$=1.46~1.48 A. The three-element system proposed by the present invention is not only an innovative and extraordinary method but also a unique method that varies with the characteristics of the crystal.

The introduced system regarding charge, mass and volume variation is described hereinafter. At first, unevenness of charge occurs in the crystal lattice and is determined subject to partial substitution of $Al^{+3}$ by smaller electric charges $Li^{+1}$ and $Mg^{+2}$. Internal crystal fields have unevenness characteristic, more particularly, the emission spectrum of the crystal field around the active ions $Ce^{+3}$ should be broadened. $Ce^{+3}$ is coordinated with the ions of Al, Li and Mg by means of direct surrounding of oxygen ions. This is an important supplement. It indicated that, due to uneven surrounding by $O^{-2}$ and $N^{-3}$, the coordinate range around $Ce^{+3}$ causes the emission spectrum of $Ce^{+3}$ to be narrowed, and the deformation is resulted from alteration $O^{-2}$ and $N^{-3}$. However, increase of effective charges around $Ce^{+3}$ at the first coordinate relatively raises the chance of d-f radiative recombination in $Ce^{+3}$. Therefore, three processes are simultaneously occurred: spectrum curve: spectrum curve changes its form and its spectrum shows widening and narrowing; spectrum maximum value of the radiation curve shows symmetry; and the most important characteristic is the rise of the strength of the spectrum maximum value, i.e., the rise of the brightness of the phosphor's luminance.

Thus, all the aforesaid conditions occurred and shown in the phosphor spectrum. The emission spectrum of the garnet architecture $(Y, Gd, Ce)_3Al_5O_{12}$ is activated by the InGaN-based semiconductor heterostructure radiation at λ=464.4 nm. The emission spectrum is a Gauss curve. The maximum value of symmetry is at the radiation wavelength λ=558 nm. The upper part of this Gauss curve is symmetrical in the coordinate axes. When measured the half height, the value of the half width of the spectrum curve (half-wave width) is obtained, normally $λ_{0.5}$=120 nm. In the standard phosphor radiation of the major Gaussian spectrum curve, the long wave spectral region shows geometric symmetry, spectrum width 1/10, height $λ_{0.1}$=280 nm. Under these conditions, the radiation short wave extends to 140 nm, and the long wave is 418 nm.

When studied the spectrum of the phosphor $\Sigma(Ln)_3Al_{5-x}Li_{(x+y)}Mg_{(x+y)}O_{12-3y}N_{3y}$, constantly activated by λ=465 nm, we can discover the features that: the spectrum maximum value is substantially changed, providing a special form (acute angle becomes blunted); Luminance maximum value is shifted to 8~10 nm short wave region; half-wave width of spectrum maximum value is substantially reduced Δ=5.6 nm; the position of the maximum value becomes $λ_{max}$=549.8 nm; the spectrum does not show any symmetry. When the half height of the spectrum short wave is 54 nm, the long wave is 60.5 nm. When the value of the spectrum width is 1/10 of the height, the short wave and the long wave are 130 nm and 150 nm respectively. At this time, the luminance parameter value of the phosphor prepared according to the present invention is L=34051 units, about 12% higher when compared to the parameter value L=30384 units of a standard phosphor. The substantial difference in the major parameter of these radiation materials are rarely shown in patent discussion.

When studied the features of the phosphor prepared according to the present invention and a conventional standard phosphor and the following substitute models with different valences, we can see the substitution results of different volumes in the garnet substrate provided by the present invention and the variation in unit charge volume after adding of greater sizes of $Li^{+1}$, $Mg^{+2}$, more particularly $N^{-3}$. Actually, if the standard yttrium-gadolinium garnet substrate-based phosphor is recorded to be $a_0$=12.045 A, the series of the provided sample parameter values to be $a_1$=12.055 A, $a_2$=12.058 A and $a_3$=12.061 A. Lattice parameter value "a" causes two effects on the phosphor provided by the present invention. The first effect is to increase cerium ion balance concentration. Following increasing of [$Ce^{+3}$] balance concentration, the luminance of the phosphor is relatively enhanced. The above description of the present invention points out one system that determines enhancement of luminance and enlarges the first coordinate range of oxygen-nitrogen around $Ce^{+3}$. Increase in phosphor lattice volume and electric charge cause a change of the shape of the spectrum curve. However, as stated above, a substitute for an ion of different volume in the lattice causes a severe mechanical stress in the phosphor microcrystal, thereby lowering the degree of dispersion of the phosphor powder (this will be discussed further). During growing of the microcrystal powder, the mechanical stress causes formation of two different forms of garnet powders, i.e., the polyhedron and the rhombic dodecahedron.

The invention noticed that the high luminance intensity value of the garnet substrate-based phosphor was firstly been seen. Actually, in the last 50 years of history, YAG substrate-based phosphor has been continuously improved. During this period, the luminance intensity of the phosphor upon activation of electrons has been increased by 25% (the luminance efficiency of an early cathode-ray tube display is η~6.8 cd/W≈21 lm/W). By the end of 2006, this parameter becomes η=26 lm/W. From 1962~1997, YAG material photoluminescence has been improved at the speed of 0.1% per year, total 3%. Due to the use of $Y_3Al_5O_{12}$:Ce in the last decade, the parameter of quantum efficiency is increased by 15%, i.e., from η=80% in 1997 to η=95% in 2007. It is excellent that the efficiency has been improved by +13%. This is a breakthrough achievement. The rare earth garnet substrate-based high-brightness phosphor is characterized by the ratio of rare earth elements in the cation crystal lattice to be: 0.30≦Y/ΣLn≦0.95, 0.05≦Gd/ΣLn≦0.70, 0.005≦Ce/ΣLn≦0.1, 0.001≦Dy/ΣLn≦0.01 and 0.001≦Pr/ΣLn≦0.01.

According to the cited references, the major attribute of the phosphor is determined directly subject to every element in the substrate of the cation crystal lattice of the luminous material. First, $Y^{+3}$ is the carrier of the properties of the garnet. $Ce^{+3}$ is mainly for yellow-orange yellow emission with radiation maximum value $\lambda_{max}$=538 nm. $\tau_{Ce}$≈1.13 A that is substantially greater than the ionic radius of is added to the cation crystal lattice. It diffuses on the surface of $Y_2O_3$ powder. Therefore, to obtain the optimal concentration 0.005≦[Ce]≦0.05, high-temperature preparation, or precipitation of the ions ($Y^{+3}$ and $Ce^{+3}$), for example, hydroxide or oxalate-based precipitation technique is necessary.

There is a big amount of $Gd^{+3}$ in the cation crystal lattice of the phosphor prepared according to the present invention. The content of $Gd^{+3}$ in the cation crystal lattice is 5~70% atomic fraction. Because of minor ionic radius, they forms a Y—Gd-aluminum garnet solid solution. When the content of $Gd^{+3}$ in the solid solution reaches 20%, the garnet lattice parameter is reduced to a=12.004 A. Because the crystal cell volume is reduced, the internal crystal field is increased to act upon $Ce^{+3}$. When the maximum concentration of the added $Gd^{+3}$ reaches the extent that [$Gd^{+3}$]>30% atom, the radiation maximum value becomes λ=564~566 nm.

The solid solution between Y—Gd that contains a large concentration of [Gd] and the former is delaminated into two solid solution ions, i.e., $Gd^{+3}$ in $Y_3Al_5O_{12}$ and $Y^{+3}$ in $Gd_3Al_5O_{12}$. There is no accurate method to recognize the laminal effect in a garnet solid solution. However, it has been recorded during the working process that the luminance of the garnet is substantially lowered when added a large concentration of $Gd^{+3}$. The amount of the fourth element—$Dy^{+3}$ being added to the cation crystal lattice is small. We noticed that YAG sample produces λ=560 nm yellow light only when activated by $Dy^{+3}$. This luminance may be enhanced, i.e., sensitized. This supplementary luminance with the main radiation of the $Y_3Al_5O_{12}$:Ce phosphor cause a positive effect to enhance the luminance brightness. Subject to the point of view of the present invention, the (Y, Gd, Ce, Dy, Pr)$_3$ phosphor cation crystal lattice composition provided by the present invention can create excellent conditions. This assures that the supplementary tests of adding do not enhance the brightness feature of the phosphor. These ions that are added to the phosphor substrate simply destroy the substrate properties. The phosphor provided by the present invention shows excellent performance in brightness and, is characterized in that the amount of $Li^{+1}$, $Mg^{+2}$ and $N^{-3}$ added to the anion crystal lattice is greater than 0.001 atomic fraction but smaller than 0.1 atomic fraction. Under this condition, the concentration of the added $Li^{+1}$ and $Mg^{+2}$ is within the range of [$Li^{+1}$]=[$Mg^{+2}$]=0.005 atomic fraction.

The invention noticed that the concentration of the added lithium ion and magnesium ion could be recorded by different methods. The most accurate method is the weighing method to accurately measure the weight of lithium in the compound, mainly in the form of $Li_2CO_3$ compound or magnesium carbonate compound.

As stated above, the luminous material provided by the present invention has enhanced brightness property. For example, the radiation strength of the phosphor is increased by 6%~13%. Rise of $Li^{+1}$ and $Mg^{+2}$ in the garnet composition is determined subject the charge-balance principle, and the concentration of $N^{-3}$ is directly proportional to the concentration of $Li^{+1}$ and $Mg^{+2}$. This unusual feature of the rear earth garnet substrate-based novel phosphor provided by the present invention is characterized in that the strength of the radiation maximum value of the phosphor is increased by 5~13% and, the rise of the concentration of the added $Li^{+1}$, $Mg^{+2}$ and $N^{-3}$ is the rise of the total concentration. At the same time, as indicated by the present invention, the photoradiation includes not only what the human eye observed or what a professional calibration instrument recorded but also the total energy radiation of the phosphor and the weak far infrared radiation (λ>720 nm) of the radiation spectrum of the phosphor. This energy radiation is more than a rise by 13%, i.e., ΔE=20%. This unusual advantage has been recorded in the rare earth garnet substrate-based phosphor provided by the present invention, characterized in that the total energy radiation is increased by 100~120%, i.e., a rise in mass of $Li^{+1}$, $Mg^{+2}$ and $N^{-3}$ in the phosphor composition.

At last, to complete explanation on all optical phenomena created by the phosphor of the present invention, the invention used a spectrophotometer to record all the phenomena of the dual-band white light radiation of which the color coordinates were x≧0.36 y≧0.45. This radiation is subject to international agreement regarding to white wave band of "Sun". This bright solar radiation has a great concern with a sunny day without cloud, i.e., the bright sunlight has a certain a certain percentage of blue light and reflective white light. This advantage guarantees the rare earth garnet substrate-based phosphor of the present invention that is characterized: when excited by short wave blue light λ<475 nm to produce white light, the color coordinates are x>0.36 and y>0.45, corresponding to white light wave band of the sun. The said unusual optical property of the phosphor of the present invention is not the exclusive feature. The usual dispersion of the phosphor has a great concern with nanometered materials used. By means of preparation method, the invention indicates the degree of dispersion of the phosphor.

The rare earth garnet synthesis according to the present invention includes a high temperature treatment of the raw materials. The nanometer raw materials of oxides of $Y_2O_3$, $Gd_2O_3$, $CeO_2$, $Dy_2O_3$, or hydroxide of $Ce(OH)_3$ or $Al(OH)_3$ was mixed with the active mineralizer of fluoride prepared from periodical cycle system group I, II, II elements. The materials were treated in a high-temperature stove through a four-step heat treatment. Under this treatment, the temperature difference of every heat treatment step was kept below $\Delta T=150°$ C. When at the maximum temperature value $T=1500°\pm10°$ C., the treatment was maintained for 6 hours. During this heat treatment, the stove was maintained under weak reductivity atmosphere, the produced concentration $[H_2]\leq5\%$, and flow 1 L/minute nitrogen-oxygen. It is clearly recorded that the synthesis of the phosphor used nanometered (powder size below 100 nm) oxide or hydroxide compound fractures; temperature rise in each step didn't exceed by $\frac{1}{10}$ synthesis temperature extreme; fluoride type active mineralizer was used (molten substance having minimized surface tension.

An embodiment of the synthesis of the phosphor according to the present invention is introduced hereinafter. Mixed the substances 0.75 M $Y_2O_3$, 0.078M $CeO_2$, 0.002 M $Dy_2O_3$ and 3.30 M $Al(OH)_3$. $Li^{+1}$, $Mg^{+2}$ and $N^{-3}$ were used as additives. According to the present invention, a LiMgN type binary compound was used. Carbonate was synthesized by means of carbon hot-reduction under $N_2$ atmosphere, pressure 1 atm, temperature $T=1000°$ C. Materials were put in an aludum crucible and positioned in a reaction stove and nitrogen-hydrogen atmosphere under the assistance of a pressure machine. The stove temperature was raised at a speed of 2.5~3° C./minute. When reached the temperature level of $T=1500°$ C., the heating process was ended and kept for 2 hours. Thereafter, lowered the temperature evenly at a speed of 3° C./minute. When cooled down to 100° C., the produce thus obtained was dipped in boiled water for one hour. At last, the product had a layer of nanometered $ZnO—SiO_2$ formed on the surface. Spectrophotometers, laser microparticle and powder meter and optical TV system for powder microphotography from the company "Sensing" were used to measure the phosphor parameters.

The product prepared subject to the aforesaid method was analyzed and chemically recorded to be $Y_{0.75}Gd_{0.21}Ce_{0.039}Dy_{0.001}Al_{4.995}Li_{0.005}Mg_{0.005}O_{11.99}N_{0.01}$. When compared with conventional yttrium aluminum garnet, the luminance of the phosphor prepared according to the present invention is about 11% higher, having very narrow band spectrum composition $\lambda_{0.5}=112.5$ nmv and spectrum maximum value $\lambda=549$ nm. The microphotograph of the phosphor sample prepared according to the present invention shows differences. The material powder has a three-dimensional shape. The maximum width and and the maximum height are very close. The phosphor powder is characterized by its dodecahedron configuration. To a natural garnet, this configuration is natural. This indicates the optimal status of the powder configuration under the effect of its internal mechanical stress. In conclusion, the phosphor is characterized in that the material has a three-dimensional configuration, mainly, dodecahedron, having a mid diameter $d_{50}=2~4$ µm, average diameter $d_{cp}=3.5~6$ µm, and dispersion $\delta\leq4$ unit.

In conclusion, the high-brightness yellow-orange yellow phosphor for use in warm white LED according to the present invention uses a rare-earth garnet as the substrate and Cerium as the activating agent. The composition of the high-brightness yellow-orange yellow phosphor has the substances of $Li^{+1}$, $Mg^{+2}$ and $N^{-3}$ contained therein. Following increase of the concentration of $Li^{+1}$, $Mg^{+2}$ and $N^{-3}$ in the phosphor, the total concentration is relatively increased and, the intensity of the maximum spectrum value of the phosphor is increased by 5~13%, and therefore the invention effectively eliminates the drawbacks of conventional warm white LEDs.

Although particular embodiments of the invention have been described in detail for purposes of illustration, various modifications and enhancements may be made without departing from the spirit and scope of the invention.

What the invention claimed is:

1. A high-brightness yellow-orange yellow phosphor for use in a warm white LED (light emitting diode), the high-brightness yellow-orange yellow phosphor comprising a substrate based on a rare-earth garnet and cerium for activating said substrate wherein, (a) the high-brightness yellow-orange yellow phosphor has the [substances of] $Li^{+1}$, $Mg^{+2}$ and $N^{-3}$ contained therein; (b) the overall stoichiometric equation of said substrate is: $\Sigma(Ln)_3Al_{5-x}Li_{(x+y)}Mg_{(x+y)}O_{12-3y}N_{3y}$; (c) when activated by a shortwave light from an InGaN semiconductor heterostructure, the high-brightness yellow-orange yellow phosphor radiates in a visible orange yellow band at a predetermined wavelength, and further wherein (d) the atomic fraction of the high-brightness yellow-orange yellow phosphor is $\Sigma Ln=\Sigma(Y+Gd+Ce+Dy+Pr)=1$, and the index of the stoichiometric equation is $0.0001\leq x\leq0.15$, and $0.001\leq y\leq0.15$.

2. The high-brightness yellow-orange yellow phosphor as claimed in claim 1, wherein the rare-earth garnet comprises Y, Gd, Ce, Dy and Pr and the ratio of the added cationic lattice of rare-earth elements in the high-brightness yellow-orange yellow phosphor is: $0.30\leq Y/\Sigma Ln\leq0.95$, $0.05\leq Gd/\Sigma Ln\leq0.70$, $0.005\leq Ce/\Sigma Ln\leq0.1$, $0.001\leq Dy/\Sigma Ln\leq0.01$, and $0.001\leq Pr/\Sigma Ln\leq0.01$.

3. The high-brightness yellow-orange yellow phosphor as claimed in claim 1, wherein the amount of ions added to the anionic lattice composite is $0.015>\Sigma(Li, Mg, N)>0.001$, and the optimal concentration under this condition is $[Li]=[Mg]=0.005$ atomic fraction.

4. The high-brightness yellow-orange yellow phosphor as claimed in claim 1, wherein the high-brightness yellow-orange yellow phosphor is a cubic phase powder, having a hexagonal dodecahedron configuration, mid-diameter $d_{cp}=3.5~6$ µm, dispersion $\tau=4$ units.

* * * * *